(12) United States Patent
Schütz

(10) Patent No.: US 8,567,626 B2
(45) Date of Patent: Oct. 29, 2013

(54) FASTENING DEVICE FOR FASTENING A TUBE TO A BEARING STRUCTURE AND TRANSPORT AND STORAGE CONTAINER WITH SUCH A FASTENING DEVICE

(75) Inventor: Udo Schütz, Selters (DE)

(73) Assignee: Protechna S.A., Fribourg (CH)

( * ) Notice: Subject to any disclaimer, the term of this patent is extended or adjusted under 35 U.S.C. 154(b) by 0 days.

(21) Appl. No.: 13/205,388

(22) Filed: Aug. 8, 2011

(65) Prior Publication Data

US 2012/0037528 A1  Feb. 16, 2012

(30) Foreign Application Priority Data

Aug. 12, 2010 (DE) .......................... 10 2010 039 254

(51) Int. Cl.
- *B65D 88/00* (2006.01)
- *B65D 19/00* (2006.01)
- *B23K 31/00* (2006.01)
- *B21D 39/00* (2006.01)

(52) U.S. Cl.
USPC .................. 220/1.6; 206/86; 29/510; 228/136

(58) Field of Classification Search
USPC ............. 220/1.6, 1.5, 23.87, 23.91, 622, 401, 220/692, 693, 9.1–9.4; 206/386, 600, 599, 206/597; 228/136, 139; 29/510, 511, 515, 29/516, 521; 285/382
See application file for complete search history.

(56) References Cited

U.S. PATENT DOCUMENTS

| | | | |
|---|---|---|---|
| 2,576,049 A | 11/1951 | Shott | |
| 3,352,070 A | 11/1967 | Raynes | |
| 4,062,167 A | 12/1977 | Gilb | |
| 4,291,996 A | 9/1981 | Gilb | |
| 4,676,373 A * | 6/1987 | Schneider | 206/386 |
| 4,909,387 A * | 3/1990 | Schutz | 206/386 |
| 5,111,937 A * | 5/1992 | Schutz | 206/386 |
| 5,447,250 A * | 9/1995 | Schutz | 220/62.11 |
| 5,678,688 A * | 10/1997 | Schutz | 206/386 |
| 7,025,223 B2 * | 4/2006 | Hamm | 220/485 |
| 7,036,662 B2 * | 5/2006 | Schutz | 206/386 |
| 7,913,850 B2 | 3/2011 | Schutz | |

FOREIGN PATENT DOCUMENTS

| | | |
|---|---|---|
| EP | 2090520 A | 8/2009 |
| JP | S43-006879 | 7/1939 |
| JP | 2005-029954 | 2/2005 |
| JP | 200-190790 | 8/2009 |

OTHER PUBLICATIONS

Translation of Japanese Office Action.

* cited by examiner

*Primary Examiner* — Mickey Yu
*Assistant Examiner* — Shawn Braden
(74) *Attorney, Agent, or Firm* — Lucas & Mercanti, LLP; Klaus P. Stoffel

(57) ABSTRACT

A fastening device for fastening a tube to a bearing structure, particularly a horizontal mesh frame tube of a mesh cage attached to a transport pallet used to hold a liquid container. To form the fastening device the tube has a fastening section with a zone flattened by compression and provided with a fastening hole to accommodate a fastening bolt connecting the fastening section to the bearing structure. The fastening hole has a perimeter shaped such that the perimeter defines a force application plane between a bolt head and the fastening section that is inclined at an angle α relative to a fastening plane in which the fastening section is connected to the bearing structure. The perimeter has a hole embrasure formed by an annular collar extending in the direction of a fastening axis, and which defines a bearing surface for the bolt head disposed in the force application plane.

3 Claims, 2 Drawing Sheets

U.S. Patent
Oct. 29, 2013 Sheet 1 of 2 US 8,567,626 B2
Fig. 1
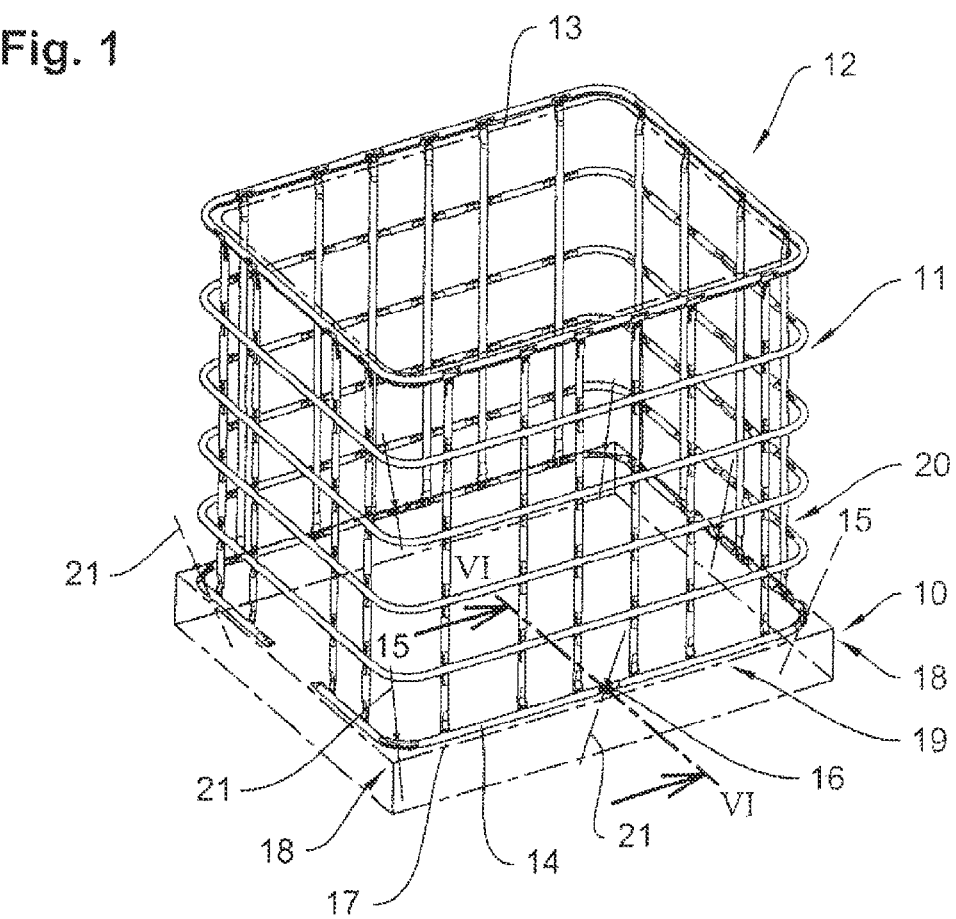
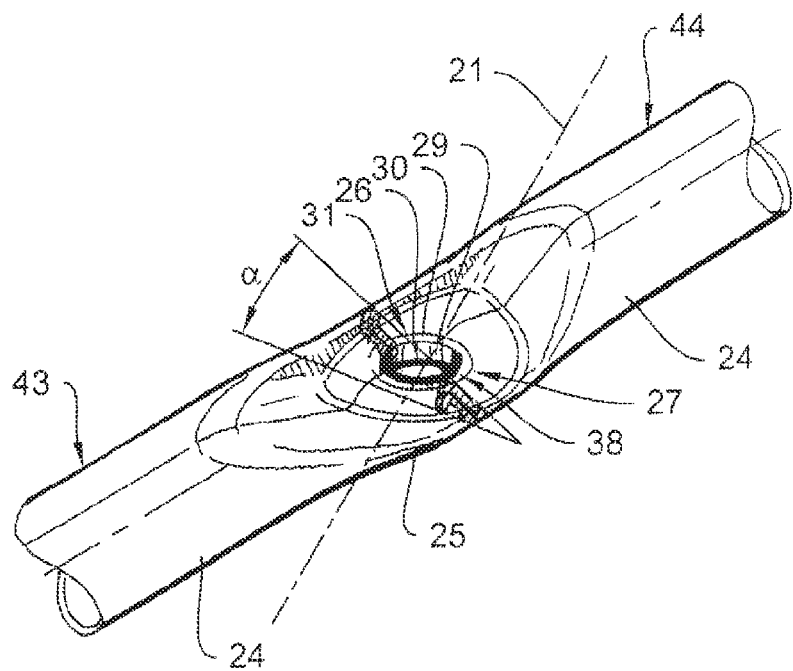
Fig. 2

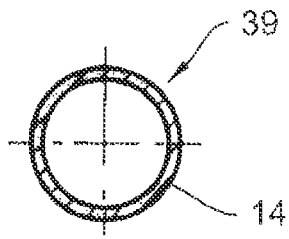
Fig. 3
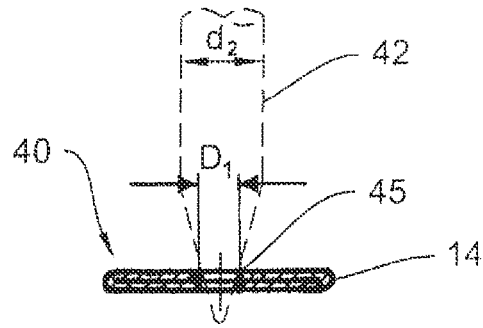
Fig. 4
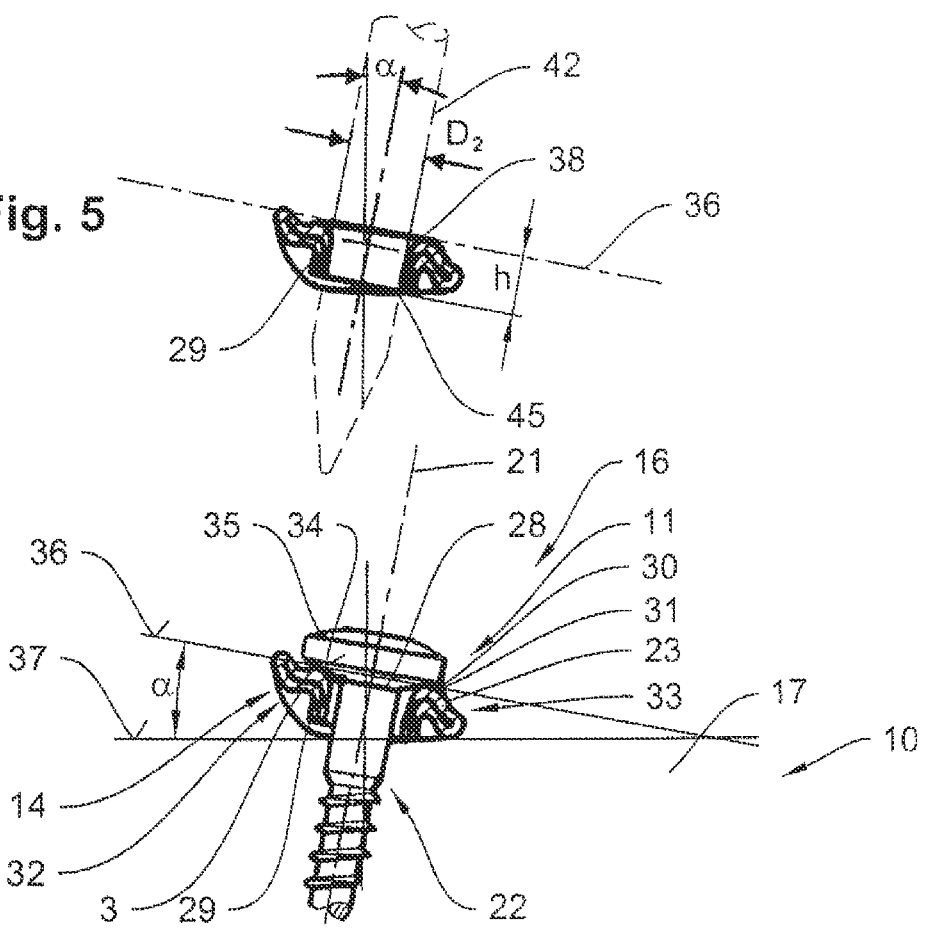
Fig. 5
Fig. 6

FASTENING DEVICE FOR FASTENING A TUBE TO A BEARING STRUCTURE AND TRANSPORT AND STORAGE CONTAINER WITH SUCH A FASTENING DEVICE

CROSS-REFERENCE TO RELATED APPLICATIONS

The present application claims priority of DE 10 2010 039 254.5-24, filed Aug. 12, 2010, the priority of this application is hereby claimed and this application is incorporated herein by reference.

BACKGROUND OF THE INVENTION

The present invention relates to a fastening device for fastening a tube to a bearing structure, particularly a horizontal mesh frame tube of a mesh cage attached to a transport pallet that is used to hold a liquid container, wherein in order to form the fastening device the tube has a fastening section with a zone that has been flattened by compression, the zone being provided with a fastening hole to accommodate a fastening bolt connecting the fastening section to the bearing structure, wherein the fastening hole has a perimeter shaped such that the hole perimeter defines a force application plane between a bolt head and the fastening section that is inclined at an angle α relative to a fastening plane in which the fastening section is connected to the bearing structure. The present invention also relates to a method for producing such a fastening device and a transport and storage container for liquids that is equipped with such a fastening device.

Fastening devices of the type described in the introduction are particularly used to secure mesh cages in liquid transport and storage containers, also called IBCs, in which the mesh cage serves to hold and protect a liquid container that is made from plastic and disposed on a transport pallet. Since the inner container of an IBC is often used for holding toxic or chemically aggressive liquids, the reliability of the fastening device is of particularly high importance.

In order to secure the mesh cage on the transport pallet, a lower, horizontally extending mesh frame tube is attached to the transport pallet via fastening means of the type described in the introduction. To ensure that the mesh cage or the lower horizontal frame tube may be fastened to the transport pallet from outside the mesh cage, the known fastening devices are designed such that the fastening bolts, which usually have the form of fastening screws, may be screwed with an outwardly inclined fastening or bolting axis through a fastening hole formed in the fastening section and into a base of the transport pallet. To this end, an inner section of the perimeter of the fastening hole is curved away from a fastening plane defined by the pallet base of the transport pallet, while an outer section of the hole perimeter is located in the fastening plane, so that a defined bearing surface is created for the bolt head of the fastening screw both on the inside and the outside despite the fact that the bolting or screwing axis is inclined towards the outside. In this context, the screw head is braced only by a circular collar in the area of the inner hole perimeter section, and consequently if the screw is subjected to excessively high tightening torque or unfavourable operating loads, such as may occur when an IBC is being handled, a bending moment is exerted on the screw head, which in extreme cases may cause the part to fail due to breakage of the fastening screw, or the screw head may be sheared off.

This in turn may lead to damage that renders the IBC unusable, and thus considerable financial losses may be suffered as a result of the failure of a fastening device, and if the inner container is damaged by the failure of the component, the liquid held in the inner container may also escape, causing corresponding harm to the environment.

SUMMARY OF THE INVENTION

The object underlying the present invention is therefore to suggest a fastening device of the type described in the introduction that enables the screwing or bolting axis to be orientated towards the fastening plane without the accompanying risk that this will cause a component to fail. In addition, the object underlying the invention is to suggest a transport and storage container for liquids of increased operating safety.

In the fastening device according to the invention, the hole perimeter is furnished with an embrasure that is formed by an annular collar extending in the direction of a fastening axis, and which defines a bearing surface for the bolt head disposed in the plane of application of forces.

The configuration according to the invention enables a flat bearing surface for the bolt head that is present consistently both on the inner section of the hole perimeter and the outer section of the hole perimeter. The consequence of this is that the forces applied to the fastening section of the tube are spread evenly around the circumference of the bolt head. Additionally, as a result of the annular collar, which protrudes in the direction of the fastening axis, an area is formed in the fastening section that enables stresses to be dissipated through corresponding deformation in the event of increased tensile stresses acting on the bolt head that can occur as a result of excessive tightening torque or higher dynamic operating loads.

It is particularly advantageous if the bearing surface for the bolt head is formed by a foldable rim formed on the edge of the hole by a bracing foot of the annular collar so that the contact surface of fastening section for the bolt head is formed by the smooth surface of the tube material and force may easily be transferred from the screw head to the fastening section without any notch effects.

If the foldable rim also has a protruding rim that rises above the adjacent hole perimeter area, and which forms the contact surface for the screw head, it is possible to define the contact surface particularly precisely.

It is possible to ensure a particularly smooth transfer of force between the fastening bolt or bolt head and the fastening section if the fastening section has a hole perimeter with an S-bend shape in the cross-section extending through the fastening hole, so that only the annular collar of the hole perimeter but the entire area of the hole perimeter has particularly high deformation capability due to its geometrical conformation, so that stress peaks due to dynamic operating loads that would otherwise be exerted on the bolt head may be dissipated.

In the method according to the invention, after an area of the tube is flattened to form a fastening section, first an initial bore is carried out, the borehole having a smaller dimension than would be necessary to accommodate the fastening bolt.

The fastening hole with a diameter larger than the diameter of the initial bore that ultimately enables the fastening bolt to be inserted and pass through, is subsequently created in a deep drawing process by introducing a deep drawing mandrel into the initial bore and enlarging the bore while simultaneously creating an annular collar around the rim of the hole, which is created by the buckling of the hole perimeter due to the deep drawing process.

Finally according to the invention, the fastening section is offset with respect to adjacent tube sections, thus causing the plane of force application, that is to say the plane in which force is transferred from the head of the fastening bolt to the fastening section, to be offset from the fastening plane.

The process according to the invention described above for creating a hole wall conformed in the manner of a socket due to the annular collar enables forces to be transferred between the bolt head and the fastening section evenly around the entire circumference. Moreover, it is possible to create such a fastening hole, with the diameter necessary for accommodating the fastening bolt, without recourse to material machining method that would cause a notch effect in the area of the hole perimeter. Instead, the hole rim formed in the material of the fastening section is offset from the force application plane by the height of the annular collar as a result of the reshaping process.

It has proven to be particularly advantageous if the offset of the fastening section with respect to the adjacent tube sections is effected by a swivelling motion of the deep drawing mandrel inserted in the initial bore, so that the use of separate tools for carrying out the offsetting operation is at least minimised.

If the swivelling motion of the deep drawing mandrel is superimposed with the deep drawing motion of the deep drawing mandrel, the offset and formation of the fastening hole may be carried out essentially in a single reshaping operation.

Because of its fastening device, the transport and storage container for liquids constructed according to the invention provides exceptional protection for the connection between the mesh cage and the transport pallet against component failure, and thus also improved protection for the inner container.

In the following, an embodiment of the fastening device and a configuration of a transport and storage container having such a fastening device as well as a possible method for manufacturing such a fastening device will be explained in greater detail with reference to the drawing.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

BRIEF DESCRIPTION OF THE DRAWING

In the drawing:

FIG. 1 shows an IBC with a mesh cage secured on a transport pallet and which accommodates an inner container;

FIG. 2 shows a fastening section of a bottom horizontal tube of the mesh cage of FIG. 1;

FIG. 3 shows cross-section of the horizontal tube free and without deformation;

FIG. 4 shows a cross-section of the horizontal tube that has been flattened by compression;

FIG. 5 shows a fastening section of the horizontal tube that has been reshaped by deep drawing;

FIG. 6 is a cross-sectional view of an attachment device along a sectional line VI-VI in FIG. 1.

DETAILED DESCRIPTION OF THE INVENTION

FIG. 1 shows a mesh cage 1 of a transport and storage container 12 in the form of an IBC, mounted on a transport pallet 10, the mesh cage 11 serving to protect a liquid container 13 made from plastic and situated on transport pallet 10. As is indicated in FIG. 1 by fastening axes 21, a bottom horizontal tube 14 of mesh cage 11 is connected to a pallet base 17 of transport pallet 10 via multiple fastening devices 15, 16. Fastening devices 15 are located in corner areas 18 of mesh cage 11 and fastening devices 16 are located in long-side sections 19 and short-side sections 20 of mesh cage 11. Apart from the fact that fastening devices 15 in corner areas 18 of mesh cage 11 extend over curved sections of bottom horizontal tube 14, in all other respects they are of exactly the same construction as fastening devices 16, which are located in straight sections of bottom tube 14.

Fastening devices 15, 16 are furnished with fastening screws 22 along fastening axes 21 in FIG. 1, and these, as shown in FIG. 6, are aligned such that fastening screws 22 are readily accessible and easy to screw in from outside mesh cage 11 to produce a screwed connection between mesh cage 11 and transport pallet 10.

In the following, the structure of a fastening device 16 will be explained in greater detail with reference to FIGS. 2 to 6 in combination. To this end, FIG. 6 is a cross-sectional view of a fastening section 23 of the fastening device 16 arranged in long-side section 19 in FIG. 1 with a fastening screw 22 screwed into pallet base 17 of transport pallet 10. FIG. 2 shows fastening section 23 illustrated separately to enable a clearer understanding of the explanation.

As is shown in FIGS. 2 to 6, fastening section 23 has a flattened area 25 created by deforming free tube cross section 24, and in which there is a fastening hole 26 with a hole perimeter 27 having a roughly S-bend shaped cross-section and an embrasure 28 with an annular collar 29 that forms a foldable rim 31 in the area of a bracing foot 30, which rim merges into hole perimeter sections 32 and 33 arranged radially with respect to fastening axis 21.

As is shown particularly clearly in FIG. 2, hole perimeter 27 is conformed essentially in the manner of a socket due to the hole embrasure 28 with annular collar 29, wherein bracing foot 30 of the annular collar forms a rim elevation 34 in the area of foldable rim 31 due to the S-bend shaped configuration of hole perimeter sections 32, 33, on which elevation is supported the underside of a bolt or screw head 35 of fastening screw 22 screwed to pallet base 17 as shown in FIG. 6.

Bracing foot 30 of annular collar 29 and the foldable rim 31 defines a bracing surface 38 (FIG. 2) for bolt head 35 of fastening screw 22, defining a force application plane 36 that is inclined at an angle α to a fastening plane 37 defined by pallet base 17.

As is shown particularly in FIG. 6, the bracing surface 38 (FIG. 2) defined by bracing foot 30 of annular collar 29 creates a bracing surface 38 contacting the full circumference of the underside of bolt head 35 with correspondingly evenly distributed transmission of forces between bolt head 35 and fastening section 23 of fastening device 16. In addition, annular collar 29 particularly cooperates with the S-bend shaped hole perimeter sections 32, 33 to form a deformation body, so that stress peaks may be dissipated by deformations of this deformation body in fastening section 23, or hole perimeter sections 32, 33, without placing additional load on fastening screw 22.

The method for producing fastening section 23 of fastening device 16 shown in FIGS. 2 and 6 is illustrated clearly by considering FIGS. 3, 4 and 5 together. As shown by comparing FIGS. 3 and 4, in order to produce fastening 23 from a free tube cross section 39 without deformation, tube 14 is first compressed to produce the flattened area 25 shown in FIG. 4 in which opposing inner wall areas of tube cross section 39 are brought into contact with one another and the shape of tube cross section 39 is modified to a flat cross section 40. An initial borehole having a diameter $D_1$ is created in flat cross section 40, diameter $D_1$ being smaller than a diameter $D_2$ of fastening hole 26 that is created in fastening section 23 and shown for example in FIG. 6, and in which fastening screw 22 is inserted and accommodated.

After this, a deep drawing mandrel 42 having a diameter $d_2$ is inserted in the initial borehole with diameter $D_1$ in a deep drawing process that is not illustrated further here, expanding the borehole and creating the annular collar 29 shown in FIG. 5 and also widening fastening hole 26 to a diameter $D_2$.

Simultaneously with the deep drawing process described above, deep drawing mandrel 42 is pivoted through an angle α to form the offset shown in FIG. 5 in such manner that fastening section 23 is offset with respect to adjacent, non-deformed tube sections 43, 44 as shown in FIG. 2, and force application plane 36 is defined as shown in FIG. 6.

As is particularly plain from FIG. 5, the deep drawing process described in the preceding causes a hole perimeter 45 defined by the initial borehole shown in FIG. 4 to be offset from force application plane 36 and relocated at a distance from bracing surface 38 corresponding to height h of annular collar 29, which defines force application plane 36. In this way, a notch effect induced by hole perimeter 45 is shifted out of force application plane 36 and is thus no longer able to contribute to weakening of the cross section that is exposed to stresses in force application plane 36.

While specific embodiments of the invention have been shown and described in detail to illustrate the inventive principles, it will be understood that the invention may be embodied otherwise without departing from such principle.

I claim:

1. A fastening device for fastening a tube to a bearing structure, wherein the fastening device comprises: a fastening section of the tube, which fastening section has a flattened zone created by compression, the zone being provided with a fastening hole; and a fastening bolt accommodated in the fastening hole to connect the fastening section to the bearing structure, wherein the fastening hole has a hole perimeter shaped so that the hole perimeter defines a force application plane between a bolt head and the fastening section that is inclined at an angle α relative to a fastening plane in which the fastening section is connected to the bearing structure, wherein the hole perimeter has a hole embrasure that is formed by an annular collar extending in a direction of a fastening axis, and which defines a bearing surface for the bolt head disposed in the force application plane, wherein the bearing surface is formed by a foldable rim created by a bracing foot of the annular collar on the hole perimeter, wherein the foldable rim has a rim elevation that projects above an adjacent hole perimeter area, and wherein hole perimeter of the fastening section has an S-bend shape in a cross-section extending through the fastening hole.

2. The fastening device as recited in claim 1, wherein the tube is a horizontal mesh frame tube and the bearing structure is a transport pallet used to hold a liquid container.

3. A transport and storage container for liquids, comprising: an inner container made from plastic with a closable filling port and a drain spigot for connection of a tapping fitting; an outer mantle constructed as a mesh cage having vertical and horizontal mesh frame tubes; and a support structure including a transport pallet that is configured to enable handling using stacker trucks or storage and retrieval machines, the transport pallet having a pallet base for supporting the inner container, and in order to connect the mesh cage to the transport pallet a horizontal mesh frame tube adjacent to the pallet base is connected to the transport pallet by a fastening device that includes a fastening section of the tube, which fastening section has a flattened zone created by compression, the zone being provided with a fastening hole, and a fastening bolt accommodated in the fastening hole to connect the fastening section to the transport pallet, wherein the fastening hole has a hole perimeter shaped so that the hole perimeter defines a force application plane between a bolt head and the fastening section that is inclined at an angle α relative to a fastening plane in which the fastening section is connected to the transport pallet, wherein the hole perimeter has a hole embrasure that is formed by an annular collar extending in a direction of a fastening axis, and which defines a bearing surface for the bolt head disposed in the force application plane, wherein the bearing surface is formed by a foldable rim created by a bracing foot of the annular collar on the hole perimeter, wherein the foldable rim has a rim elevation that projects above an adjacent hole perimeter area, and wherein hole perimeter of the fastening section has an S-bend shape in a cross-section extending through the fastening hole.

* * * * *